(12) United States Patent
Kim (10) Patent No.: US 11,066,104 B2
(45) Date of Patent: Jul. 20, 2021

(54) VEHICLE BODY STRUCTURE AND VEHICLE INCLUDING THE SAME

(71) Applicants: Hyundai Motor Company, Seoul (KR); Kia Motors Corporation, Seoul (KR)

(72) Inventor: Hyung Tae Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 124 days.

(21) Appl. No.: 16/664,099

(22) Filed: Oct. 25, 2019

(65) Prior Publication Data

US 2020/0377154 A1 Dec. 3, 2020

(30) Foreign Application Priority Data

Jun. 3, 2019 (KR) .......................... 10-2019-0065634

(51) Int. Cl.
| | |
|---|---|
| *B60K 1/04* | (2019.01) |
| *B62D 21/09* | (2006.01) |
| *B60K 15/063* | (2006.01) |
| *B62D 25/20* | (2006.01) |
| *B62D 21/02* | (2006.01) |
| *H01M 50/20* | (2021.01) |
| *B60K 6/28* | (2007.10) |

(52) U.S. Cl.
CPC ................ *B62D 21/09* (2013.01); *B60K 1/04* (2013.01); *B60K 6/28* (2013.01); *B60K 15/063* (2013.01); *B62D 21/02* (2013.01); *B62D 25/20* (2013.01); *B62D 25/2036* (2013.01); *H01M 50/20* (2021.01); *B60K 2001/0427* (2013.01); *B60K 2015/0634* (2013.01); *H01M 2220/20* (2013.01)

(58) Field of Classification Search
CPC ............. B62D 25/20; B60K 6/28; B60K 1/04
See application file for complete search history.

(56) References Cited

U.S. PATENT DOCUMENTS

| | | | | |
|---|---|---|---|---|
| 4,216,839 A | * | 8/1980 | Gould | ................... B60L 3/0015 180/65.1 |
| 7,374,219 B2 | * | 5/2008 | Brennecke | ........... B62D 29/002 296/187.02 |

(Continued)

FOREIGN PATENT DOCUMENTS

| | | |
|---|---|---|
| JP | 2007-039020 A | 2/2007 |
| JP | 2013-071692 A | 4/2013 |
| KR | 10-1786263 B1 | 10/2017 |

*Primary Examiner* — John D Walters
*Assistant Examiner* — James J Triggs
(74) *Attorney, Agent, or Firm* — Morgan, Lewis & Bockius LLP (57) ABSTRACT

A vehicle body structure includes a battery mounting portion arranged on a floor of a vehicle and having a battery disposed thereon; a first cross member arranged in a front side of the battery mounting portion and reinforcing the floor; a second cross member arranged in a rear side of the battery mounting portion and reinforcing the floor; first and second extension members extending in a longitudinal direction so as to connect the first and second cross members while being spaced apart from each other in a transverse direction, and reinforcing a lower portion of the battery mounting portion; and a coupling structure coupled to the first and second cross members in a state of coupling the battery.

20 Claims, 8 Drawing Sheets

(56) References Cited

U.S. PATENT DOCUMENTS

| | | | |
|---|---|---|---|
| 9,027,684 B2* | 5/2015 | Araki | B60K 1/04 180/68.5 |
| 9,944,161 B2 | 4/2018 | Shimasaki et al. | |
| 2016/0006008 A1* | 1/2016 | Volz | B60K 1/04 429/61 |
| 2018/0134324 A1* | 5/2018 | Son | B60K 1/04 |
| 2020/0114747 A1* | 4/2020 | Lian | B62D 21/09 |

* cited by examiner

VEHICLE BODY STRUCTURE AND VEHICLE INCLUDING THE SAME

CROSS-REFERENCE TO RELATED APPLICATION(S)

The present application is based on and claims the benefit of priority to Korean Patent Application No. 10-2019-0065634, filed on Jun. 3, 2019 in the Korean Intellectual Property Office, the disclosure of which is incorporated herein by reference in its entirety.

TECHNICAL FIELD

The present disclosure relates to a vehicle body structure capable of enhancing torsional rigidity and longitudinal and transverse directions flexural rigidity by improving a coupling and supporting structure of a battery, and a vehicle including the same.

BACKGROUND

Generally, Hybrid electric vehicles (HEVs) and plug-in hybrid electric vehicles (PHEVs) include not only a fuel tank but also a large-capacity battery due to characteristics of a driving system.

As above vehicles are equipped with the large-capacity battery on a rear floor side, it is necessary to locally reinforce such a large-capacity battery for enhancing torsional rigidity, and longitudinal and transverse directions flexural rigidity of a vehicle body structure around the battery.

However, a conventional reinforcement of the vehicle body structure has difficulties to enhance the rigidity of the body structure as a whole, because it is achieved by locally increasing the rigidity of a coupling portion for fixing the battery to the body structure.

The information included in this Background section is only for enhancement of understanding of the general background of the present disclosure and may not be taken as an acknowledgement or any form of suggestion that this information forms the prior art already known to a person skilled in the art.

SUMMARY

According to an aspect of the present disclosure, a vehicle body structure is capable of enhancing torsional rigidity, and longitudinal and transverse directions flexural rigidity by improving a coupling and supporting structure of a battery, and a vehicle including the same. Additional aspects of the disclosure will be set forth in part in the description which follows and, in part, will be obvious from the description, or may be learned by practice of the disclosure.

In accordance with one exemplary embodiment of the present disclosure, a vehicle body structure includes a battery mounting portion arranged on a floor of a vehicle and having a battery disposed thereon; a first cross member arranged in a front side of the battery mounting portion and configured to reinforce the floor; a second cross member arranged in a rear side of the battery mounting portion and configured to reinforce the floor; first and second extension members extending in a longitudinal direction so as to connect the first and second cross members, the first and second extension members being spaced apart from each other in a transverse direction of the vehicle and configured to reinforce a lower portion of the battery mounting portion; and a coupling structure coupled to the first and second cross members in a state of coupling the battery.

Further, the vehicle body structure may further include left and right center side members configured to reinforce the floor of the front of the battery mounting portion, and respectively connected to a first position where the first cross member and the first extension member are connected to each other, and to a second position where the first cross member and the second extension member are connected to each other.

Further, the coupling structure may include a first coupling frame coupling the battery to the battery mounting portion in a front-rear direction, the first coupling structure having one end engaged to the first cross member to which the first extension member is connected and another end engaged to the second cross member to which the first extension member is connected. The coupling structure may further include a second coupling frame coupling the battery to the battery mounting portion in the front-rear direction, the second coupling structure having one end engaged to the first cross member to which the second extension member is connected and another end engaged to the second cross member to which the second extension member is connected.

Further, the coupling structure may further include a third coupling frame coupling the battery to the battery mounting portion in the transverse direction, and both ends of the third coupling frame are coupled to respective side portions of the floor of the vehicle.

Further, the floor of the vehicle may include left and right rear side members at the side portions thereof, and the both ends of the third coupling frame are coupled to a reinforcing member arranged on the left and right rear side members, respectively.

Further, the coupling structure may further include an upper frame configured to reinforce an upper circumferential portion of the battery and coupled to the first, second, and third coupling frames.

Further, the coupling structure may further include at least one fourth coupling frame extending from the upper frame to be coupled to the first cross member, and engaging a front outer side of the battery; and at least one fifth coupling frame extending from the upper frame to be coupled to the second cross member, and engaging a rear outer side of the battery.

Further, the vehicle body structure may further include a plurality of reinforcing members arranged in the first and second cross members to reinforce a portion engaged to the first and second coupling frames.

Further, the vehicle body structure may further include a fuel tank mounting portion arranged below the battery mounting portion, wherein an engaging portion of a fuel tank is mounted to the fuel tank mounting portion.

Further, the fuel tank mounting portion may be disposed at a position where the left and right center side members and the first and second extension members are connected.

In accordance with another aspect of the present disclosure, a vehicle includes the above mentioned body structures.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to sufficiently transfer the technical concepts of the disclosure to one of ordinary skill in the art. However, the disclosure is not limited to these embodiments, and may be embodied in another form. In the drawings, parts that are irrelevant to the descriptions may be not shown in order to clarify the disclosure, and also, for easy understanding, the widths, lengths, thicknesses, etc. of components are more or less exaggeratedly shown. Like numbers refer to like elements throughout this specification.

Figure 1:
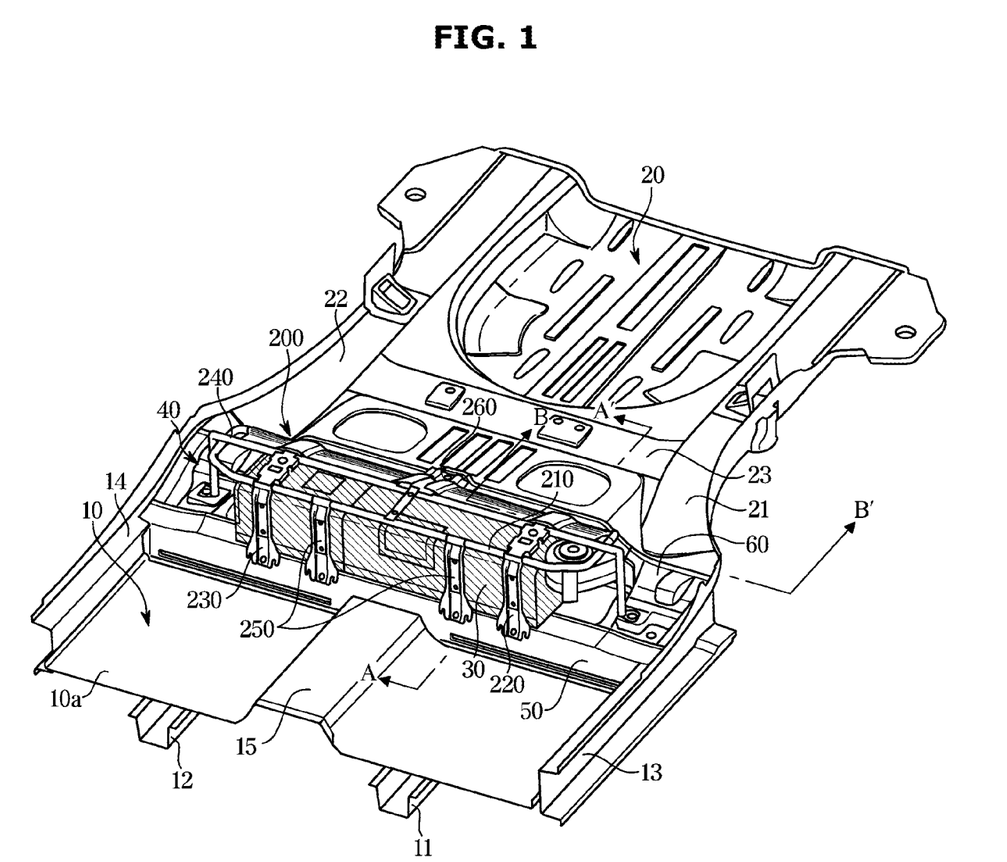
FIG. 1 is a perspective view of a vehicle body structure according to an exemplary embodiment of the present disclosure.
Figure 2:
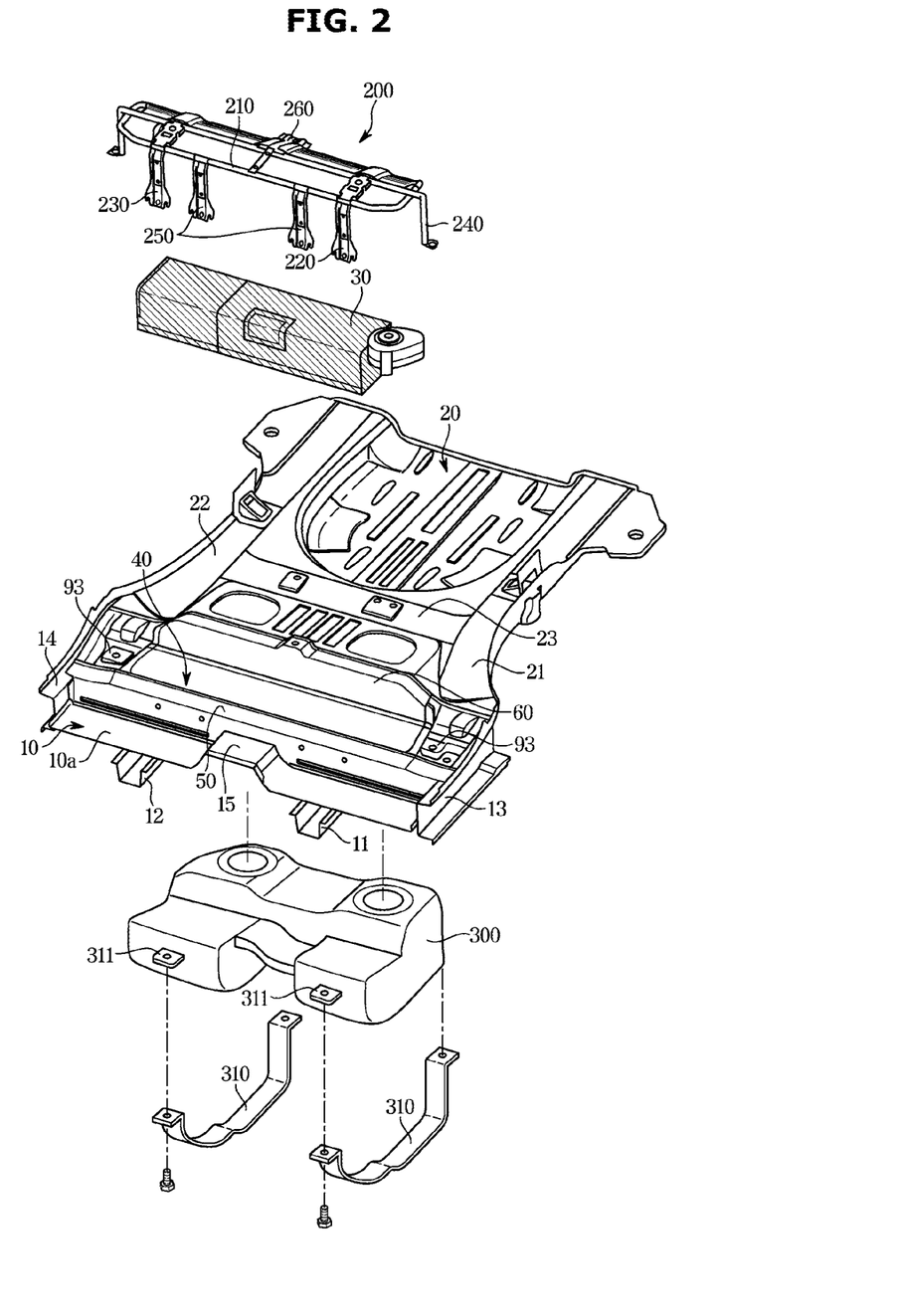
FIG. 2 is an exploded perspective view of the vehicle body structure showing a state in which a battery and a fuel tank are separated, according to an exemplary embodiment of the present disclosure.
Figure 3:
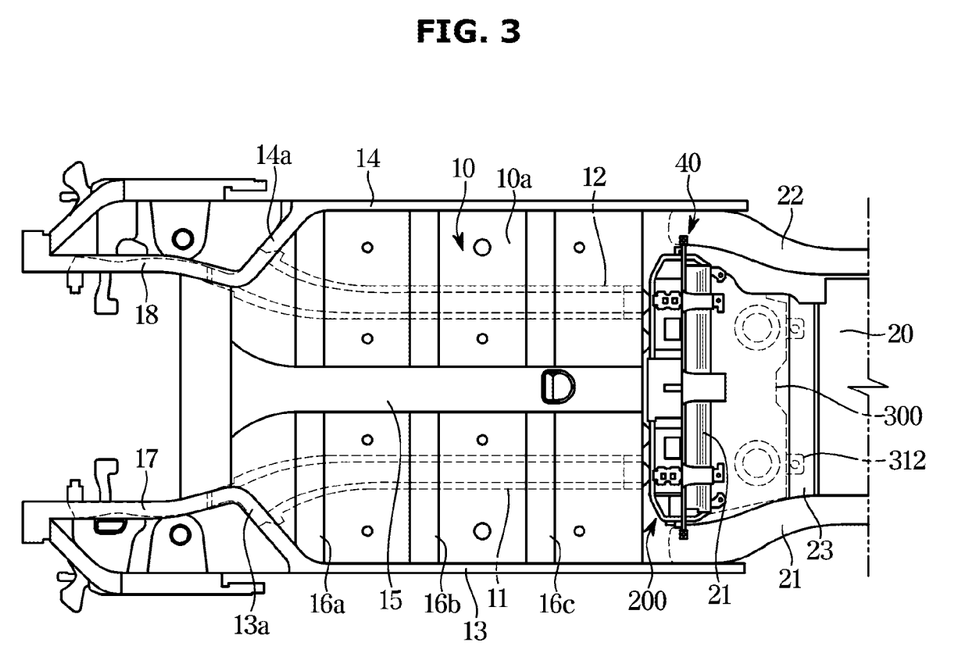
FIG. 3 is a plan view of the vehicle body structure according to an exemplary embodiment of the present disclosure.

FIGS. 1, 2, and 3 show a vehicle body structure according to an exemplary embodiment of the disclosure which includes a center floor 10 forming a floor of a passenger space in a vehicle, a rear floor 20 arranged behind the center floor 10, a battery mounting portion 40 arranged between the center floor 10 and the rear floor 20 and on which a battery 30 is mounted, a coupling structure 200 coupling the battery 30, first and second cross members 50 and 60 reinforcing the battery mounting portion 40 side, and first and second extension members 70 and 80.

The center floor 10 may include left and right center side members 11 and 12, left and right side sills 13 and 14, a center tunnel 15, and a plurality of center cross members 16a, 16b and 16c. The left and right center side members 11 and 12 may reinforce the center floor 10 while being coupled to a lower portion of a panel 10a configuring to the center floor 10. The left and right center side members 11 and 12 may extend in a front-rear direction to increase a longitudinal flexural rigidity and a front end thereof is connected to left and right front side members 17 and 18, respectively.

Referring to FIG. 3, the left and right side sills 13 and 14 may be elongated in the front-rear direction so as to reinforce left and right ends of the center floor 10. The left and right side sills 13 and 14 may be connected to extension structures 13a and 14a extending in the oblique direction from the left and right front side members 17 and 18, respectively.

As shown in FIG. 2, the rear floor 20 may include left and right rear side members 21 and 22, and a rear cross member 23. The left and right rear side members 21 and 22 may be elongated in the front-rear direction on both sides so as to increase the longitudinal flexural rigidity of the rear floor 20 and may be connected to rear ends of the left and right side sills 13 and 14, respectively.

Figure 7:
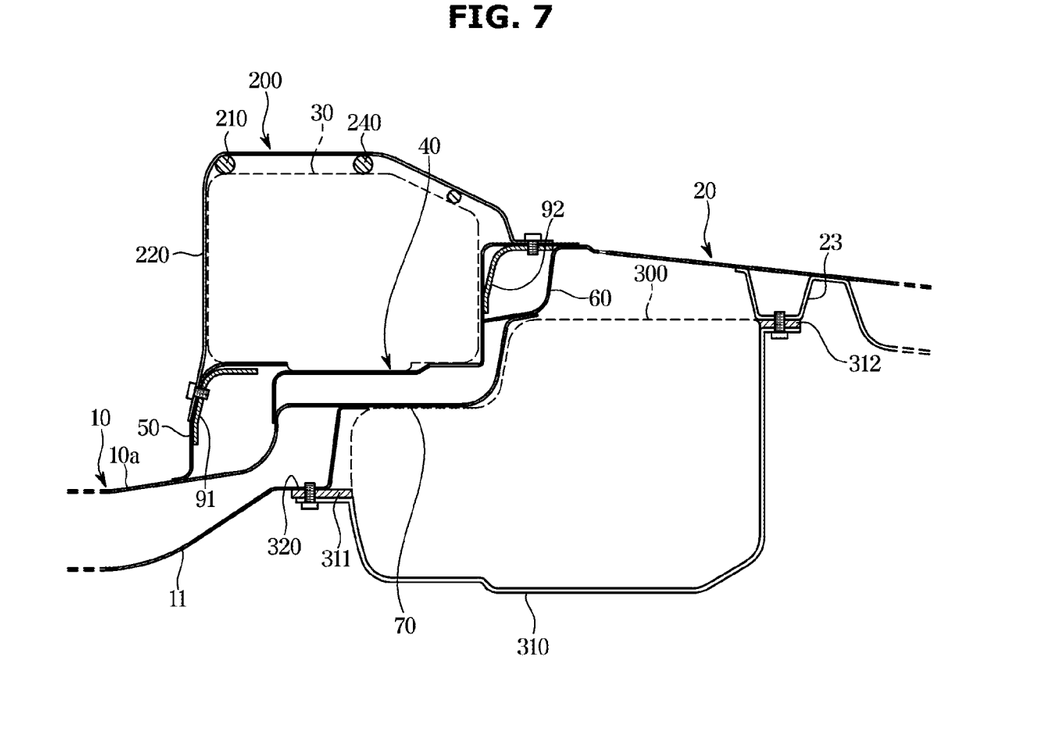
FIG. 7 is a cross-sectional view taken along A-A' line of FIG. 1.

The first cross member 50 may extend in a transverse direction at a boundary portion where the battery mounting portion 40 and the center floor 10 are connected to each other, to increase a transverse flexural rigidity of the battery mounting portion 40. Both ends of the first cross member 50 may be respectively connected to the left side sill 13 and the right side sill 14, and also respectively connected to rear ends of the left and right center side members 11 and 12 on both sides of the center floor 10, between which the panel 10a is located. That is, as shown in FIGS. 4 and 7, the first cross member 50 may be coupled (e.g., via welding) to an upper surface of the panel 10a, and the left and right center side members 11 and 12 may be coupled (e.g., via welding) to an lower surface of the panel 10a on which the first cross member 50 is located, so that the left and right center side members 11 and 12 are structurally connected to the first cross member 50.

The second cross member 60 may extend in the transverse direction at a boundary portion where the battery mounting portion 40 and the rear floor 10 are connected to each other, to increase the transverse flexural rigidity of the battery mounting portion 40. Both ends of the second cross member 60 may be respectively connected to the left and right rear side members 21 and 22.

Figure 4:
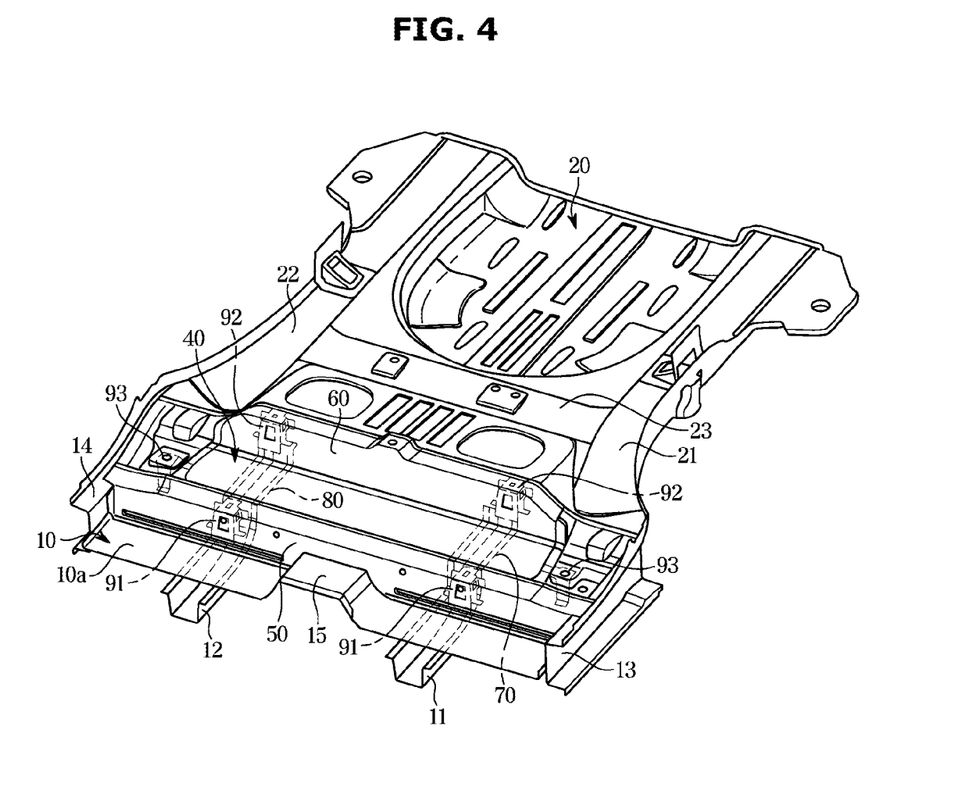
FIG. 4 is a perspective view of the vehicle body structure showing first and second extension members, according to an exemplary embodiment of the present disclosure.

Referring to FIG. 4, the first and second extension members 70 and 80 may extend in the longitudinal direction so as to connect the first and second cross members 50 and 60 while being spaced apart from each other in the transverse direction. That is, the first and second extension members 70 and 80 may extend rearward from a position where the left and right center side members 11 and 12 and the first cross member 50 are connected to each other, to connect to the second cross member 60, respectively. The first and second extension members 70 and 80 may increase the longitudinal flexural rigidity of the battery mounting portion 40. Each front ends of the first and second extension members 70 and 80 may be coupled (e.g., via welding) to a rear end of the left and right center side members 11 and 12 and to the first cross member 50.

As shown in FIGS. 3 and 4, the left and right front side members 17 and 18, the left and right center side members 11 and 12, and the first and second extension members 70 and 80 of the above-described vehicle body structure may be arranged so as to be continuously connected in the longitudinal direction, thereby increasing the longitudinal flexural rigidity. In addition, in a frontal collision of the vehicle, collision energy may be transmitted to the first and second extension members 70 and 80 through the left and right front side members 17 and 18 and the left and right center side members 11 and 12, and may reach the battery mounting portion 40 and be dispersed.

Referring to FIG. 7, the first cross member 50 may support a lower portion of the battery 30, and the second cross member 60 may support a side of a rear of the battery 30 at a position higher than the first cross member 50. Accordingly, the battery mounting portion 40 may stably support the battery 30 mounted thereon, and may provide a space for mounting a fuel tank 300 thereunder.

Referring to FIGS. 2 and 7, a fuel tank mounting portion 320, to which a front engaging portion 311 of the fuel tank 300 is mounted, may be arranged below the battery mounting portion 40. In a state where a lower both sides of the fuel tank 300 are respectively engaged by an engaging member 310, each of the front engaging portions 311 of both sides thereof may be mounted to the fuel tank mounting portion 320 arranged below the battery mounting portion 40, and each of rear engaging portions 312 of both sides thereof may be mounted to a rear cross member 23.

The fuel tank mounting portion 320, on which the front engaging portion 311 of the fuel tank 300 is mounted, may be located at a position where the left and right center side members 11 and 12 and the first and second extension members 70 and 80 are connected to each other. That is, the fuel tank mounting portion 320 may be arranged on the same line as the left and right center side members 11 and 12 and the first and second extension members 70 and 80.

The above-described vehicle body structure is configured such that the fuel tank mounting portion 320 may be disposed at a position where the left and right center side members 11 and 12 and the left and right extension members 70 and 80 are connected to each other. Accordingly, the fuel tank 300 may function as a structure associated with the left and right center side members 11 and 12, thereby increasing the rigidity of the vehicle body structure. In addition, in a collision of the vehicle, the collision energy transmitted in the longitudinal direction through the left and right center side members 11 and 12 may be dispersed to the fuel tank 300 as well by reaching the fuel tank mounting portion 320.

Figure 5:
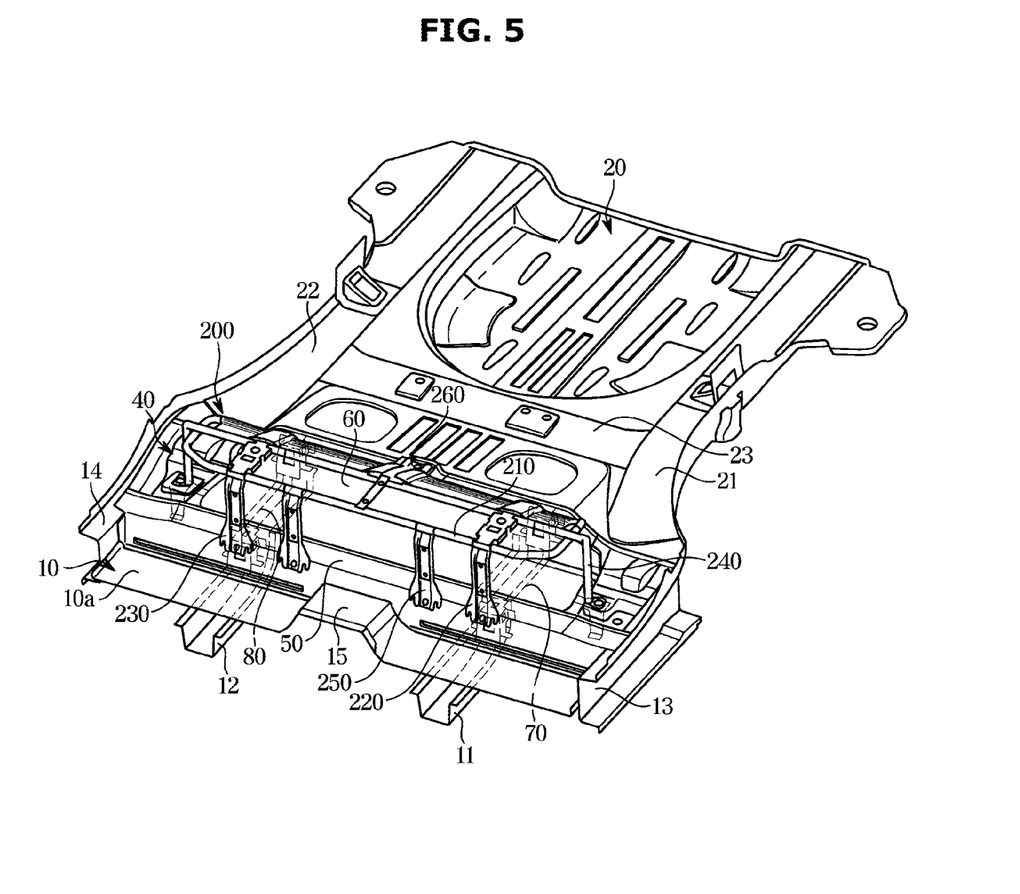
FIG. 5 is a perspective view of the vehicle body structure showing a state of a coupling structure, according to an exemplary embodiment of the present disclosure.
Figure 6:
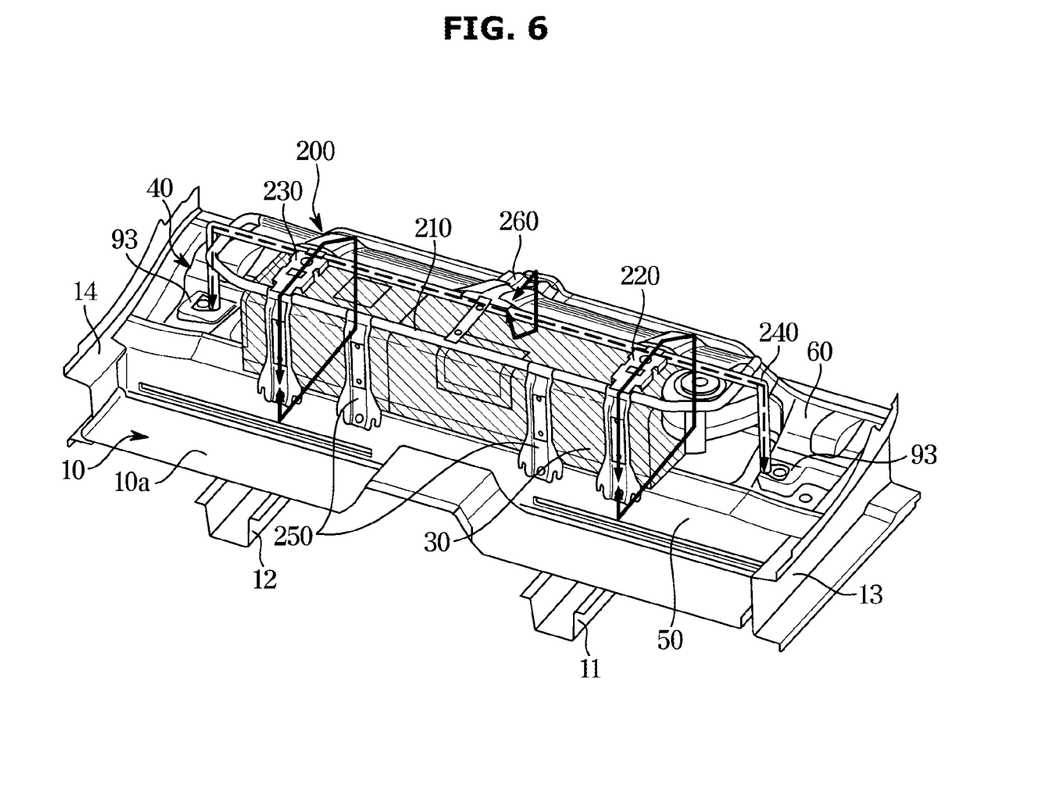
FIG. 6 is a perspective view of the vehicle body structure showing a state where a battery is joined by the coupling structure, according to an exemplary embodiment of the present disclosure.

Referring to FIGS. 2, 5 and 6, the coupling structure 200 for coupling the battery 30 includes an upper frame 210, a first coupling frame 220, a second coupling frame 230, a third coupling frame 240, a fourth coupling frame 250, and a fifth coupling frame 260. In a state of coupling the exterior of the battery 30, the coupling structure 200 may be respectively engaged to the first and second cross members 50 and 60 connected to the first and second extension members 70 and 80, and a reinforcing members 93 disposed on the left and right rear side members 21 and 22.

The upper frame 210 may have a shape in which a steel bar for reinforcing an upper circumferential portion of the battery 30 is curved along the circumference. The first, second, and third coupling frames 220, 230 and 240 may be joined to an outer side of the upper frame 210 or may be coupled to the upper frame 210 by, e.g., welding.

The first coupling frame 220 may join the outer side of the battery 30 in the front-rear direction. One end of the first coupling frame 220 may be engaged to the first cross member 50 to which the first extension member 70 is connected, and the other end thereof may be engaged to the second cross member 60 to which the first extension member 70 is connected.

The second coupling frame 230 may join the outer side of the battery 30 in the front-rear direction in the same manner as the first coupling frame 220. One end of the second coupling frame 230 may be engaged to the first cross member 50 to which the second extension member 80 is connected, and the other end thereof may be engaged to the second cross member 60 to which the second extension member 80 is connected.

The third coupling frame 240 may join the outer side of the battery 30 in a transverse direction in such a manner as to cross the first and second coupling frames 220 and 230 on an upper side of the battery 30. Both ends of the third coupling frame 240 may be respectively engaged to the reinforcing members 93 disposed on the left and right rear side members 21 and 22, respectively. The third coupling frame 240 may be coupled (e.g., via welding) to the first and second coupling frames 220 and 230 at portions intersecting the first and second coupling frames 220 and 230.

The fourth coupling frame 250 may be provided in plural. The fourth coupling frame 250 may extend toward the first cross member 50 with the upper thereof welded to a front outer side of the upper frame 210, and may be engaged to the first cross member 50.

The fifth coupling frame 260 may be provided in plural. The fifth coupling frame 260 may extend from the upper frame 210 toward the second cross member 60, may be coupled (e.g., via welding) to a rear outer side of the upper frame 210, and may be engaged to the second cross member 60.

In the above-described coupling structure 200, the first coupling frame 220, the second coupling frame 230, the plurality of fourth coupling frames 250, and the plurality of fifth coupling frames 260 may engage the outer side of the battery 30 in the longitudinal direction and the third coupling frame 240 engages the outer side of the battery 30 in the transverse direction, resulting in that the battery 30 can be firmly fixed to the battery mounting portion 40.

Figure 8:
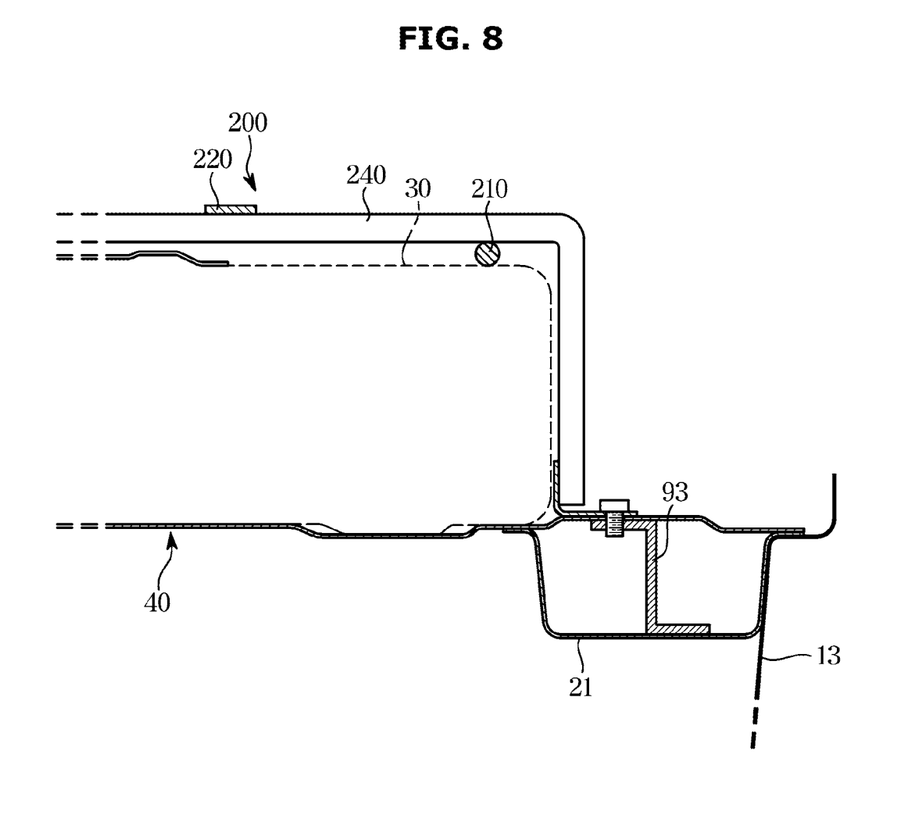
FIG. 8 is a cross-sectional view taken along B-B' line of FIG. 1.

As shown in FIGS. 4 and 7, the inside of the first and second cross members 50 and 60 may include a plurality of reinforcing members 91 and 92 for reinforcing a portion to which the first and second coupling frames 220 and 230 are engaged. In addition, as shown in FIG. 8, each of the left and right rear side members 21 and 22 may include the reinforcing member 93 for reinforcing a portion to which both ends of the third coupling frame 240 are engaged.

As shown in FIGS. 5 to 7, the first coupling frame 220 may annularly engage the outer side of the battery 30 together with the first extension member 70, and the second coupling frame 230 may annularly engage the outer side of the battery 30 together with the second extension member 80. In addition, as shown in FIGS. 6 and 8, both ends of the third coupling frame 240 may be firmly engaged to the reinforcing members 93 disposed on the left and right rear side members 21 and 22, respectively.

The coupling structure 200 may enhance the torsional rigidity and the longitudinal and transverse directions flexural rigidity of the vehicle body structure as well as firmly coupling the battery 30. In addition, the coupling structure 200 may strengthen the rigidity of the battery mounting portion 40 together with the first extension member 70, the second extension member 80, the first cross member 50, and the second cross member 60, thereby enhancing overall rigidity of the vehicle body structure.

As is apparent from the above, the vehicle body structure according to an exemplary embodiment of the present disclosure is configured such that the first and second extension members may reinforce the lower portion of the battery mounting portion and the coupling structure may be engaged to the first and second cross members connected to the first and second extension members. Therefore, the battery can be firmly coupled.

The vehicle body structure according to an exemplary embodiment of the present disclosure is configured with the coupling structure for coupling the battery to the vehicle body, such that the vehicle body structure can be strengthened together with the first extension member, the second extension member, the first cross member, and the second cross member. The left and right center side members may be connected to the position where the first cross member and the first and second extension members are connected. Therefore, not only around the battery mounting portion, but also overall longitudinal and transverse directions flexural rigidity, and the torsional rigidity can be increased.

The vehicle body structure according to an exemplary embodiment of the present disclosure can increase the longitudinal flexural rigidity because the left and right front side members, the left and right center side members, and the first and second extension members are continuously arranged in the longitudinal direction. In addition, the vehicle body structure according to an exemplary embodiment of the disclosure can transmit the longitudinal collision energy to the first and second extension members through the left and right center side members, and the collision energy can reach the battery mounting portion and be dispersed.

The vehicle body structure according to an exemplary embodiment of the present disclosure is configured such that the fuel tank mounting portion is disposed at a position where the left and right center side members and the left and right extension members are connected to each other so that the fuel tank functions as a structure associated with the left and right center side members, thereby increasing the rigidity of the vehicle body structure. In addition, in a collision of the vehicle, the collision energy transmitted in the longitudinal direction through the left and right center side members can be dispersed to the fuel tank as well by reaching the fuel tank mounting portion.

What is claimed is:

1. A vehicle body structure, comprising:
   a battery mounting portion arranged on a floor of a vehicle and having a battery disposed thereon;
   a first cross member arranged in a front side of the battery mounting portion and configured to reinforce the floor;
   a second cross member arranged in a rear side of the battery mounting portion and configured to reinforce the floor;
   first and second extension members extending in a longitudinal direction so as to connect the first and second cross members, the first and second extension members being spaced apart from each other in a transverse direction of the vehicle and configured to reinforce a lower portion of the battery mounting portion; and
   a coupling structure coupled to the first and second cross members in a state of coupling the battery.

2. The vehicle body structure of claim 1, further comprising
   left and right center side members configured to reinforce the floor of the front side of the battery mounting portion, and respectively connected to a first position where the first cross member and the first extension member are connected to each other, and to a second position where the first cross member and the second extension member are connected to each other.

3. The vehicle body structure of claim 2,
   wherein the coupling structure comprises:
   a first coupling frame coupling the battery to the battery mounting portion in a front-rear direction, the first coupling frame having one end engaged to the first cross member to which the first extension member is connected and another end engaged to the second cross member to which the first extension member is connected, and
   a second coupling frame coupling the battery to the battery mounting portion in the front-rear direction, the second coupling frame having one end engaged to the first cross member to which the second extension member is connected and another end engaged to the second cross member to which the second extension member is connected.

4. The vehicle body structure of claim 3,
   wherein the coupling structure further comprises a third coupling frame coupling the battery to the battery mounting portion in the transverse direction, and both ends of the third coupling frame are coupled to respective side portions of the floor of the vehicle.

5. The vehicle body structure of claim 4,
   wherein the floor of the vehicle includes left and right rear side members at the respective side portions thereof, and
   wherein the both ends of the third coupling frame are coupled to a reinforcing member arranged on the left and right rear side members, respectively.

6. The vehicle body structure of claim 4,
   wherein the coupling structure further comprises an upper frame configured to reinforce an upper circumferential portion of the battery, the upper frame being coupled to the first, second, and third coupling frames.

7. The vehicle body structure of claim 6,
   wherein the coupling structure further comprises:
   at least one fourth coupling frame extending from the upper frame to be coupled to the first cross member, and engaging a front outer side of the battery; and
   at least one fifth coupling frame extending from the upper frame to be coupled to the second cross member, and engaging a rear outer side of the battery.

8. The vehicle body structure of claim 3, further comprising
   a plurality of reinforcing members arranged in the first and second cross members to reinforce a portion engaged to the first and second coupling frames.

9. The vehicle body structure of claim 2, further comprising
   a fuel tank mounting portion arranged below the battery mounting portion, wherein an engaging portion of a fuel tank is mounted to the fuel tank mounting portion.

10. The vehicle body structure of claim 9,
    wherein the fuel tank mounting portion is disposed at a position where the left and right center side members and the first and second extension members are connected.

11. A vehicle comprising a body structure, wherein the body structure includes:
    a battery mounting portion arranged on a floor of the vehicle and having a battery disposed thereon;
    a first cross member arranged in a front side of the battery mounting portion and configured to reinforce the floor in a front-rear direction of the vehicle;
    a second cross member arranged in a rear side of the battery mounting portion and configured to reinforce the floor in the front-rear direction of the vehicle;
    first and second extension members extending in a longitudinal direction so as to connect the first and second cross members, the first and second extension members being spaced apart from each other in a transverse direction of the vehicle and configured to reinforce a lower portion of the battery mounting portion; and
    a coupling structure coupled to the first and second cross members in a state of coupling the battery.

12. The vehicle body structure of claim 11, wherein the body structure further includes
    left and right center side members configured to reinforce the floor of the front side of the battery mounting portion, and respectively connected to a first position where the first cross member and the first extension member are connected to each other, and a second position where the first cross member and the second extension member are connected to each other.

13. The vehicle body structure of claim 12, wherein the coupling structure comprises:
a first coupling frame coupling the battery to the battery mounting portion in the front-rear direction, the first coupling frame having one end engaged to the first cross member to which the first extension member is connected and another end engaged to the second cross member to which the first extension member is connected, and
a second coupling frame coupling the battery to the battery mounting portion in the front-rear direction, the second coupling frame having one end engaged to the first cross member to which the second extension member is connected and another end engaged to the second cross member to which the second extension member is connected.

14. The vehicle body structure of claim 13, wherein the coupling structure further comprises a third coupling frame coupling the battery to the battery mounting portion in the transverse direction, and both ends of the third coupling frame are coupled to respective side portions of the floor of the vehicle.

15. The vehicle body structure of claim 14, wherein the floor of the vehicle includes left and right rear side members at the respective side portions thereof, and
wherein the both ends of the third coupling frame are coupled to a reinforcing member arranged on the left and right rear side members, respectively.

16. The vehicle body structure of claim 14, wherein the coupling structure further comprises an upper frame configured to reinforce an upper circumferential portion of the battery, the upper frame being coupled to the first, second, and third coupling frames.

17. The vehicle body structure of claim 16, wherein the coupling structure further comprises:
at least one fourth coupling frame extending from the upper frame to be coupled to the first cross member, and engaging a front outer side of the battery; and
at least one fifth coupling frame extending from the upper frame to be coupled to the second cross member, and engaging a rear outer side of the battery.

18. The vehicle body structure of claim 13, wherein the body structure further includes
a plurality of reinforcing members arranged in the first and second cross members to reinforce a portion engaged to the first and second coupling frames.

19. The vehicle body structure of claim 12, wherein the body structure further includes
a fuel tank mounting portion arranged below the battery mounting portion, wherein an engaging portion of a fuel tank is mounted to the fuel tank mounting portion.

20. The vehicle body structure of claim 19, wherein the fuel tank mounting portion is disposed at a position where the left and right center side members and the first and second extension members are connected.

* * * * *